United States Patent [19]

Waterman

[11] Patent Number: 4,901,054

[45] Date of Patent: Feb. 13, 1990

[54] ALARM SYSTEM FOR AN AUTOMOBILE

[76] Inventor: Serville Waterman, 5421 Beverly Rd., Brooklyn, N.Y. 11203

[21] Appl. No.: 109,732

[22] Filed: Oct. 16, 1987

[51] Int. Cl.$^4$ ............................................. B60R 25/10
[52] U.S. Cl. ................................... 340/426; 340/428; 340/460; 340/692; 307/10.2; 307/10.4; 180/173; 180/287
[58] Field of Search ...................... 340/63–65, 340/545, 825.31, 825.32, 691, 692, 425.5–430, 459, 460; 307/10 AT, 10.2–10.7; 180/287, 173

[56] References Cited

U.S. PATENT DOCUMENTS

| | | | |
|---|---|---|---|
| 4,401,971 | 8/1983 | Saito et al. | 340/692 |
| 4,435,649 | 3/1984 | Vandigriff | 340/64 |
| 4,455,551 | 6/1984 | Lemelson | 340/539 |
| 4,742,327 | 5/1988 | Burgess et al. | 307/10 AT |
| 4,749,873 | 6/1988 | Mutoh et al. | 307/10 AT |

*Primary Examiner*—Donnie L. Crosland
*Attorney, Agent, or Firm*—Edwin D. Schindler

[57] ABSTRACT

A computerized alarm system for an automobile, which is also capable of rendering the vehicle useless to anyone making a forced entry is disclosed. The invention includes a computer panel which is equipped with a keyboard for entering a secret code. The alarm system of the present invention further includes a voice synthesizer which verbally warns intruders not to take further action in an attempt to deter theft or vandalism.

5 Claims, 4 Drawing Sheets

ALARM SYSTEM FOR AN AUTOMOBILE

BACKGROUND OF THE INVENTION

1. Field of the Invention

The present invention relates to an alarm system. More particularly, the present invention concerns an alarm system, primarily intended for use in an automobile, which is essentially tamper-proof. The alarm system, which is computerized, is also capable of rendering the vehicle entered useless to anyone attempting a forced entry. Finally, it should be pointed out that while the alarm system of the invention is primarily intended for use with an automobile, many features of the invention are also adaptable for use in securing a home or other property.

2. Description of the Prior Art

Heretofore, the art has not known, or has provided, an alarm system which may warn intruders away from an automobile, make entry into the automobile difficult, warn other persons of the attempted theft of the automobile, and actually include means for preventing an intruder from tampering with, or otherwise, disconnecting the alarm.

U.S. Pat. No. 4,383,241, issued May 10, 1983, to Kojima et. al., discloses a voice warning system for vehicles which is adapted to give a voice of a specified condition which is detectable by one of a plurality of sensors, in one of a plurality of items of a vehicle which are to be checked. The invention of this reference, unlike the present invention, does not include any indication or suggestion regarding a possible modification of the disclosed invention so as to prevent would-be intruders from disconnecting the alarm system. Other differences, as will be seen hereinafter, also exist between this reference and the present invention.

U.S. Pat. No. 4,393,365, issued July 12, 1983, to Kondo et. al., discloses an automobile warning system which, unlike the present invention, includes a voice and visual alarm system for forecasting and warning an occupant rightfully in possession of an automobile of any impending or existing abnormalties. This reference is not an alarm warning system intended to secure an automobile from intruders and cannot obviously be so modified to accomplish such a purpose.

Finally, U.S. Pat. No. 4,572,652, issued Feb. 25, 1986, to Tada et. al., discloses an audible indicator means for a photocopying machine.

SUMMARY OF THE INVENTION

It is, therefore, an object of the present invention to provide an alarm system, preferably for use with an automobile, which will warn would-be intruders away and, failing that, would prevent actual theft of the automobile.

It is a further object of the present invention to provide an alarm system for an automobile which is essentially tamper-proof.

It is, yet, a further object of the present invention to provide an alarm system, primarily intended for an automobile, which overcomes the disadvantages of the prior art.

The foregoing and related objects are accomplished by a computerized alarm system for automobiles, which is also capable of rendering the vehicle useless to anyone making forced entry. The invention includes a computer panel which is equipped with a keyboard for entering a secret code. The alarm system of the present invention further includes a voice synthesizer which verbally warns intruders not to take further action, in an attempt to deter theft or vandalism.

In a preferred embodiment of the present invention, the voice synthesizer will preferably be programmed to say, something to the effect that: "The security system have been activated, you have 10 seconds in which to re-program." In such an instance, if the correct code is not entered in the allotted period of time, the voice synthesizer would then say something to the effect as: "The doors have been locked." Simultaneously therewith, the engine will turnover and the voice synthesizer would say, "Should you wish to leave this car now, press 'ALARM' on the control panel." If the alarm button is then pressed, it acts as an override which shuts off the engine, locks the steering and breaks, and turns on a siren to alert people within the area. The engine having once turned over, then shuts off, and shortly thereafter, turns over once again. This sequence is repeated so that an intruder is unable to tamper with the lead leading from the battery to the alarm. If the alarm is not pushed, the doors remain locked. Although primarily designed as an automobile alarm system, this system, through sufficient modification, could eventually be applied to residences and building security.

Since many alarms can easily be disconnected, the alarm of the present invention includes a means for preventing this. Most alarms are connected to the positive battery terminal which can be removed by a thief. The alarm of the present invention includes a special flexible metal casing and warning labels to provide further deterrence to theft. Specifically, the positive battery cable is threaded through the flexible metal casing and re-connected to the battery. Both ends of the casing are insulated with plastic covers which are provided. The casing is preferably marked with a warning to the effect that the thief should not cut through the metal casing until the battery and starter have been disconnected. The positive battery cable is also connected to an auto-start alarm system which can start the vehicle if the vehicle is tampered with. In addition, should the would-be thief cut through the metal casing, despite warning to the contrary, the thief would be exposed to a non-lethal electrical shock.

The invention will now be described in further detail with reference being made to the drawing. It, however, should be noted that the drawing illustrates but a single embodiment of the present invention, which is not so limited in scope.

BRIEF DESCRIPTION OF THE DRAWING

In the drawing, wherein similar reference numerals denote similar features throughout the several views.

DETAILED DESCRIPTION OF THE DRAWING

Figure 1:
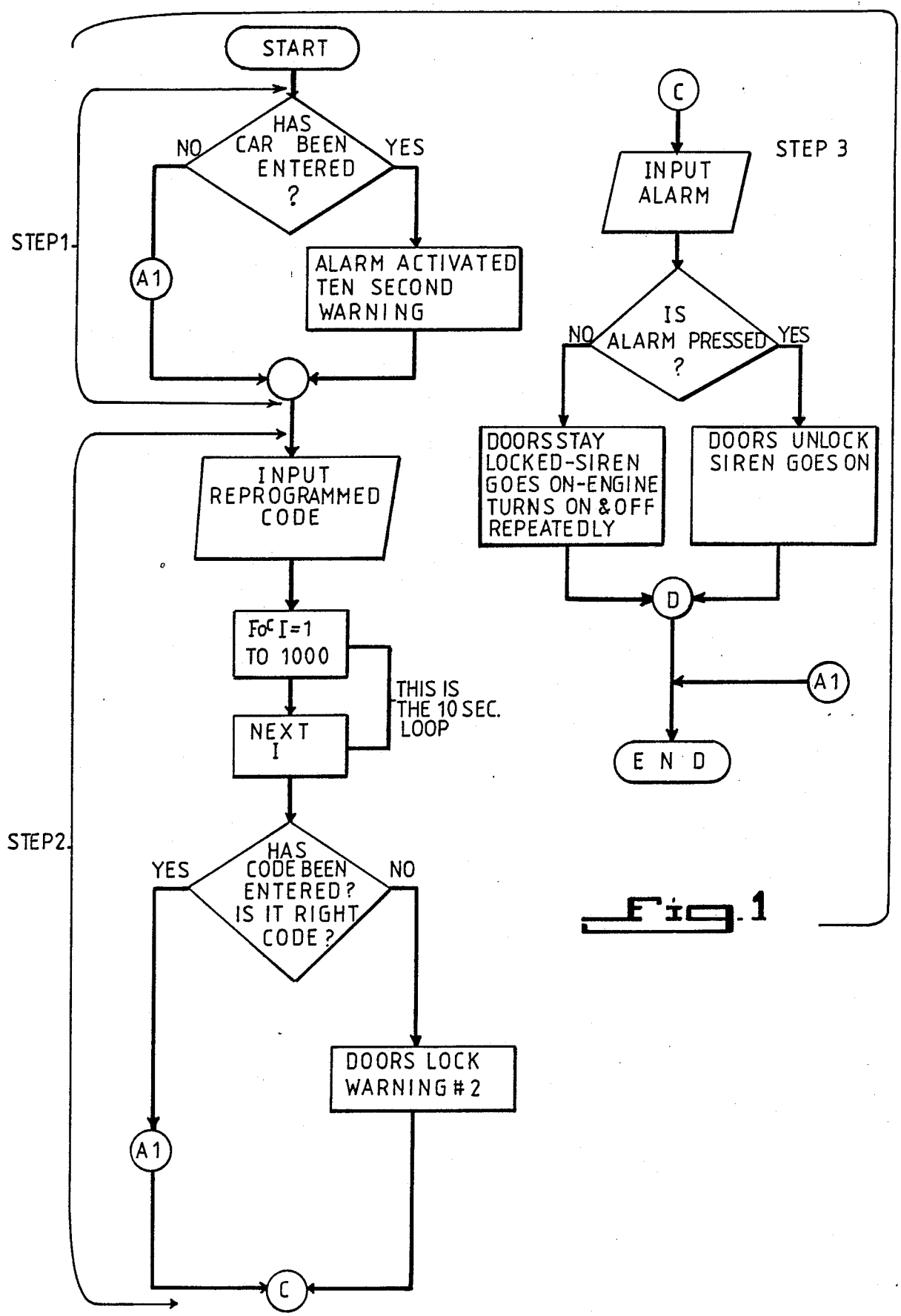
FIG. 1 is a block diagram showing the overall configuration of an embodiment of the present invention.

Turning now, in detail, to the drawing, FIG. 1 is a block diagram showing the overall construction of the present invention. The alarm of the invention is activated when the car is entered; whether such entry is proper or not. At this point, the microcomputer system of the alarm (see, FIG. 3) informs the occupant of the automobile that the alarm system of the automobile has been activated (referred to generally, as step #1 in the drawing) and the occupancy is given a warning which includes some pre-determined time period in which to take action. Preferably, this time interval or lengthier time interval is also possible. If, however, the time interval is too short, the alarm system of the car might be falsely activated. The request to enter the correct code and the warning of an alarm, are preferably given by a voice synthesizer; the technology of which is known to the art and disclosed in U.S. Pat. No. 4,383,241, issued May 10, 1983, to Kojima et. al., the relevant portions of which are incorporated by reference.

Figure 4:
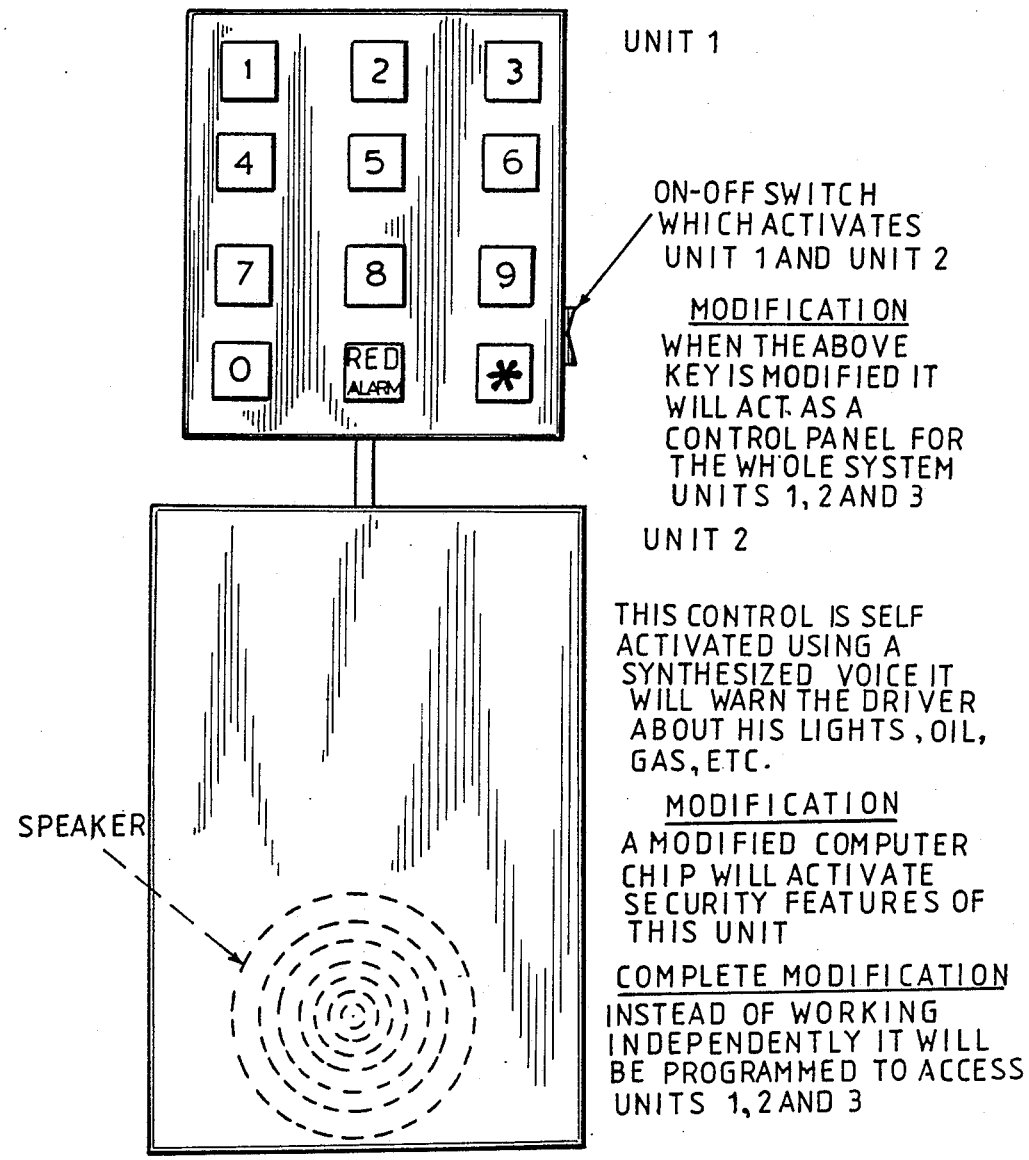
FIG. 4 is an illustration of the control panel of the present invention interacting with the voice synthesizer of the invention.
Figure 5:
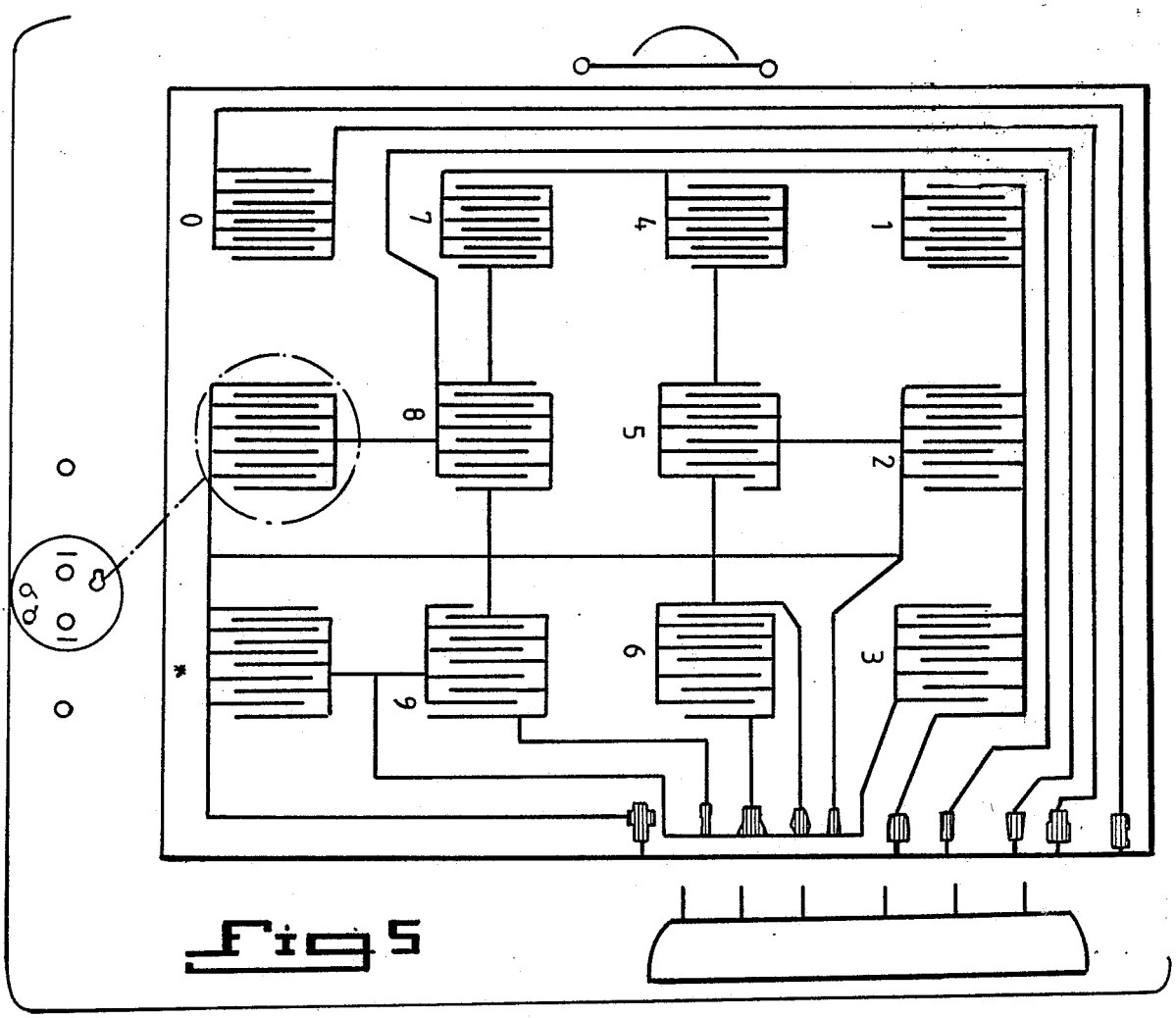
FIG. 5 is a schematic diagram of the standard connection of the present invention; and, FIG. 6 is a schematic diagram of the car ignition system, and related items in an automobile, of the present invention.

At this point, the occupant of the automobile is to input a pre-arranged code to re-program and thereby disconnect the alarm system, i.e., deactivate the alarm. The code, which should be kept secure by the owner of the automobile, is entered onto a control panel, as illustrated in FIG. 4. In the embodiment of the control panel (referred to an "UNIT 1") shown in FIG. 4, the panel is similar in design to the panel on a touch-tone telephone, however, the control panel of the invention includes a button designated "ALARM." The function of this button will be described in greater detail hereinafter. In a preferred embodiment of the invention, the "ALARM" button of the control panel is designated by a color different from the colors of the other buttons on the control panel. Preferably, the ALARM button is designated in red.

Referring, again, to FIG, 1, the predetermined re-program code is preferably a number from 1 to 1000, as shown in FIG. 1, however, it will be obvious that any number of any reasonable number of digits may be programmed into the microcomputer of the invention and serve as the code. Because the occupant of the automobile is generally given a relatively short period of time in which to input the re-program code, the code should not be unduly long. A three- or four-digit code, in all likelihood, will be sufficient to prevent random access by an unintended intruder. Entry of the code is generally referred to as "Step 2" in the drawing. Preferably, the microcomputer of the invention is programmed so that the occupant will have at least two opportunities to enter the code in the event that the proper occupant of the car inadvertently enters the incorrect code.

Should the occupant of the car fail to enter the proper code within the allotted time, the microcomputer would be programmed to lock the doors and the voice synthesizer would confirm to the occupant of the car that the doors have been so locked. In addition, the engine may be designed to turnover. In any event, the automobile cannot be moved as the brakes and the steering wheel will also be locked by the microcomputer.

In what generally designated as "Step 3" of the alarm system in the drawing, the voice synthesizer of the inventive alarm system will then inform the occupant of the car that if he desires to leave the automobile at such time, that he should press the "ALARM" button on the control panel. If the "ALARM" button is pressed, the door of the automobile unlocks and an alarm goes on to alert persons in the area about a possible/attempted theft of the automobile.

Figure 2:
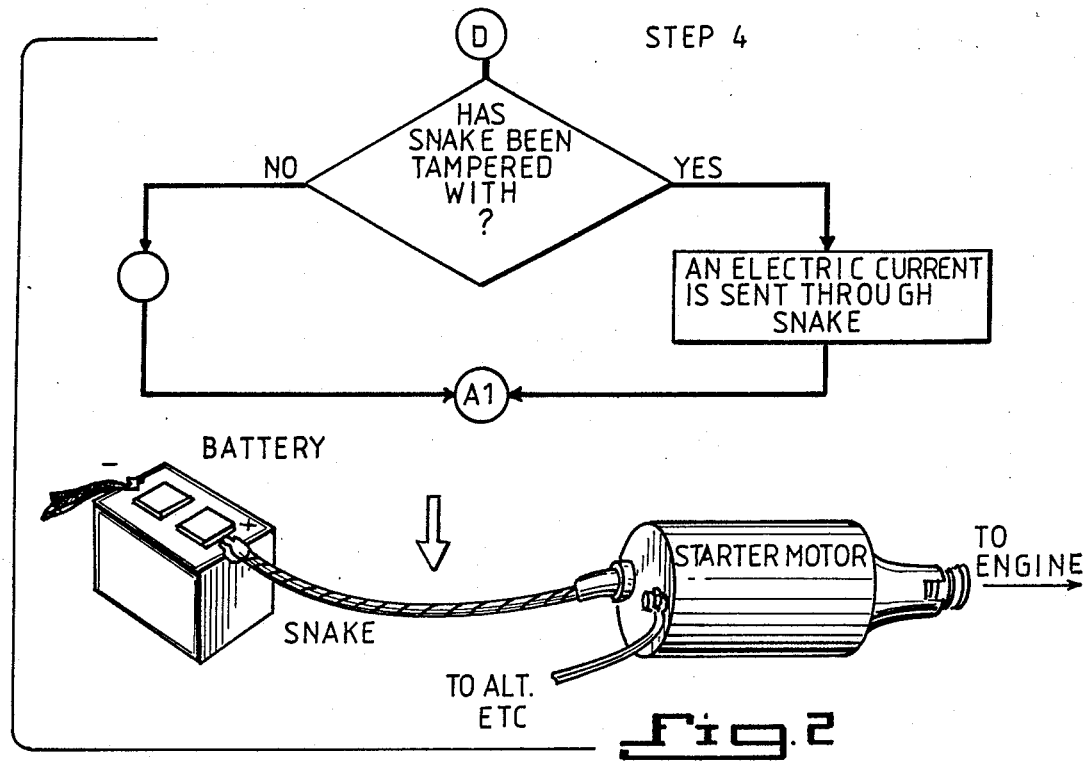
FIG. 2 is a block-diagram and schematic diagram showing the anti-tampering means of the present invention.
Figure 3:
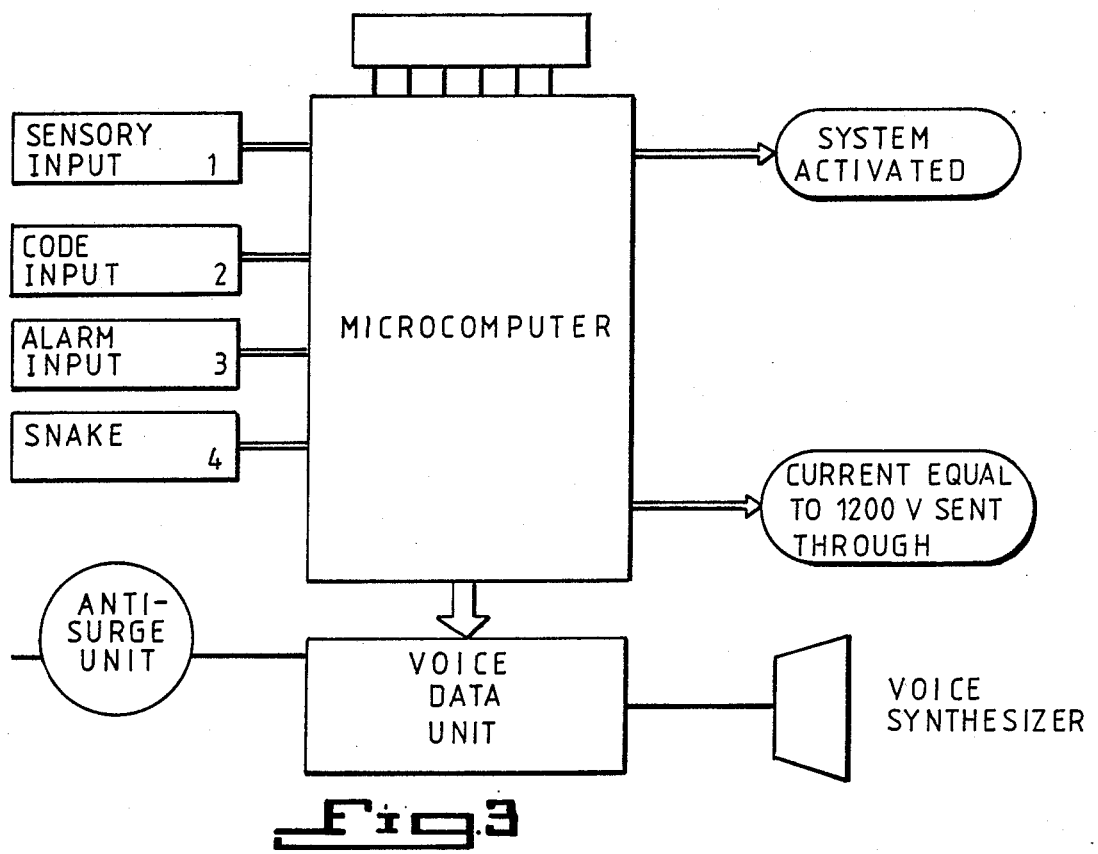
FIG. 3 shows an overall block diagram of the various features and components of the present invention and how they interact with the microcomputer of the alarm system.
Figure 6:
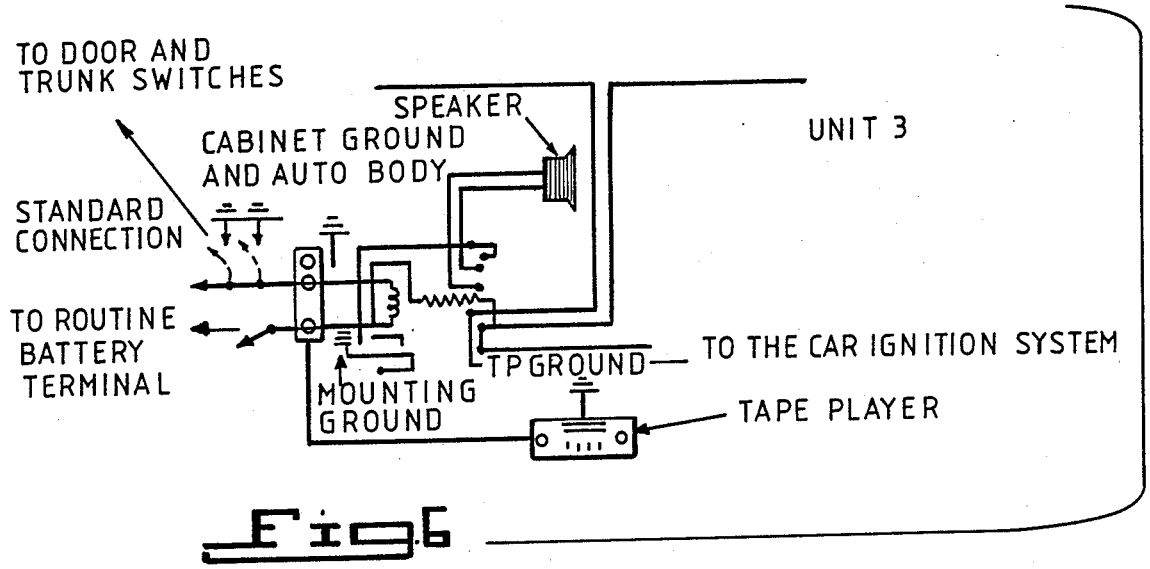

If, on the other hand, the intruder fails to push the "ALARM" button as requested to do so, the doors of the automobile remain locked, the brakes and steering wheel lock, the alarm sounds, altering people in the area about a possible theft and the engine repeatedly turns itself on and off. The purpose in this is as follows: It is well known in automobile technology that the current running through an automobile from the battery, upon ignition, is very great. By repeatedly turning the automobile on and off, the microcomputer keeps a reasonably high current running through the automobile to prevent a person from tampering with the engine, generally, or the alarm, i.e., to prevent the disconnection of the alarm. This mechanism includes an anti-surge unit (FIG. 3). In devising the alarm, it is recommended that a resister be included between the battery and the alarm, etc., so that anyone attempting to cut the snake (See, FIGS. 2 and 6, generally) may receive an electrical shock, but that such a shock will not be a lethal one. It should be explained in further detail that most alarms are connected to the positive battery terminal which can be easily removed by the thief. The alarm system of the present invention includes a special flexible metal casing. The positive battery cable is accordingly threaded through the flexible insulated casing and is reconnected to the battery. The flexible casing may be made out of metal, such as stainless steel or chromium. To prevent a person from accidentally receiving an electrical shock, the ends of the flexible casing are insulated with plastic covers. One, such as a burglar, would have to intentionally sever the snake leading from the battery in order to receive a non-lethal electrical shock.

While only several embodiments of the present invention have been shown and described, it will be obvious to those of ordinary skill in the art that many modifications may be made thereunto without departing from the spirit and scope of the invention.

What is claimed is:

1. An alarm system for an automobile comprising:
    a plurality of sensors, including at least one sensor for detecting entry into said automobile;
    a microcomputer having a control panel, said control panel including a code input and an alarm input, said microcomputer being activated by said sensor to detect entry into said automobile;
    a siren;
    a pushbutton on said control panel of said microcomputer which is capable of activating at least one sensor of said plurality of sensors for starting and turning off said automobile, at least one sensor of said plurality of sensors for locking and unlocking doors of said automobile, at least one sensor of said plurality of sensor which is capable of steering said automobile and at least one sensor of said plurality of sensors which is capable of activating said siren;
    means for voice generation including means for providing voice warning, said means for voice generation activated by said microcomputer; and,
    a snake being capable of carrying an electrical current from a battery from said automobile to said microcomputer with said snake being threaded, at least partially, through a flexible metal casing.

2. The alarm system for an automobile according to claim 1, further comprising means or locking the brakes of said automobile, said brake locking means in communication with said microcomputer, said microcomputer being acted upon by an additional sensor which, in turn, is activated by said pushbutton of said control panel.

3. The alarm system for an automobile according to claim 1, further comprising an anti-surge unit in conjunction with said means for starting and turning off said automobile.

4. The alarm system for an automobile according to claim 1, wherein said flexible metal casing is made of stainless steel.

5. The alarm system of an automobile according to claim 1, further comprising at least one resistor for said snake so that current running through said snake is reduced.

* * * * *